United States Patent Office 3,539,367
Patented Nov. 10, 1970

3,539,367
WAX EMULSIONS
George A. Yaroshevich, Watertown, Conn., and Donald R. Cushman, Wenonah, and Roy T. Edwards, Mullica Hill, N.J., assignors to Mobil Oil Corporation, a corporation of New York
No Drawing. Continuation-in-part of application Ser. No. 546,176, Apr. 29, 1966. This application Dec. 9, 1968, Ser. No. 782,428
Int. Cl. C08h 9/08
U.S. Cl. 106—271
16 Claims

ABSTRACT OF THE DISCLOSURE

Aqueous cationic wax emulsions are provided comprising a petroleum wax dispersed phase; an emulsifying agent comprising a salt of an organic or inorganic mineral acid and an amine; and an amine of lower molecular weight than the aforementioned amine, as an emulsion modifier. A method is also provided for forming such emulsions.

CROSS-REFERENCE TO RELATED APPLICATIONS

Continuation-in-part of application Ser. No. 546,176 filed Apr. 29, 1966, now abandoned.

BACKGROUND OF THE INVENTION

Field of the invention

This invention relates to wax emulsions and, in one of its aspects, relates more particularly to cationic wax emulsions. Still more particularly, in this aspect, the invention relates to cationic wax emulsions having particular utility when employed as coatings and water-proofing agents in a wide variety of industrial applications.

Description of the prior art

Cationic wax emulsions intended for use in such applications as, for example, coating materials for various types of surfaces, particle board manufacture, or internal sizing agents for paper and other pulp products, necessitate a combination of properties which include satisfactory shear stability, pumpability, non-corrosiveness, relatively low viscosity, compatibility with various types of commercially employed resinous materials and effective sizing properties. Furthermore, the ability to produce cationic wax emulsions possessing the aforementioned properties and, at the same time, having a relatively high wax-solids content, is especially desirable from a standpoint of present-day industrial requirements. Although emulsions have heretofore been produced which may possess some of the aforementioned characteristics, nevertheless, prior to the present invention, no satisfactory cationic wax emulsions have been obtained in which all of the aforementioned desirable properties are present.

SUMMARY OF THE INVENTION

In accordance with the present invention, and in accordance with its objects, there are provided new and improved cationic wax emulsions which possess good stability under shearing stress, a relatively high degree of pumpability for use in such applications as in the sizing of paper, non-corrosiveness to mechanical apparatus, relatively low viscosities, compatibility with industrial-type resins, good sizing properties and, of particular importance, possessing the ability to have incorporated therein a relatively high wax-solids content, namely, as high as about 70 percent, by weight, of the total wax emulsion.

In its generic aspects, as more fully hereinafter described, the novel cationic wax emulsions of the present invention comprise: (a) a dispersed phase comprising a petroleum wax; (b) an emulsifying agent comprising an amine salt of an acid selected from the group consisting of organic acids, having from about 1 to about 18, and preferably from about 1 to about 6 carbon atoms and inorganic mineral acids, with an amine having from about 10 to about 40, and preferably from about 20 to about 40 carbon atoms; and (c) an emulsion modifier comprising an amine having up to 12 carbon atoms and having a molecular weight lower than that of the amine reactant employed for producing the aforementioned emulsifying agent.

The preparation of the improved cationic wax emulsions of the present invention comprises, in general, the novel method of reacting an aqueous mixture of the aforementioned amine, having from about 10 to about 40 carbon atoms, with the aforementioned organic acid or inorganic acid to produce the emulsifying agent which comprises an aqueous solution of the corresponding amine salt; combining the aqueous solution of the amine salt thus produced with the aforementioned emulsion modifier, which, as previously described, comprises an amine having up to 12 carbon atoms and having a molecular weight which is lower than that employed in the amine reactant for producing the aforementioned emulsifying agent; and dispersing the petroleum wax component in the thus-combined mixture; or by adding the aforementioned emulsifying agent to the petroleum wax component and thereafter combining this mixture with the emulsion modifier.

With respect to the individual components employed for producing the novel cationic wax emulsions, the petroleum wax component is employed in an amount from about 10 to about 70, and preferably from about 40 to about 70 percent, by weight, of the total quantity of the emulsion. The emulsifying agent is employed in such an amount that it represents from about 0.5 to about 10, and preferably from about 1 to about 8 percent, by weight, based on the quantity of the petroleum wax component present. The emulsion modifier is employed in such an amount that it represents from about 0.05 to about 3, and preferably from about 0.1 to about 2 percent, by weight, based on the total quantity of the petroleum wax and emulsifying agent components present.

The petroleum wax component of the emulsion may comprise any form of petroleum wax, and may therefore be present in the form of a paraffin wax, scale wax or slack wax, as obtained from petroleum distillation processes or microcrystalline wax, such as obtained from petroleum residua; also, petroleum waxes modified with various polymers, e.g. polyethylene, or copolymers, e.g. ethylene-vinyl acetate copolymers, and similar polymeric materials.

In producing the emulsifying agent, the amine reactant, as previously described, contains from about 10 to about 40, and preferably from about 20 to about 40, carbon atoms. In this respect, the mono-amines having from about 10 to about 30 carbon atoms and the di-amines having from about 20 to about 40 carbon atoms, have been found to be most desirable. Representative examples of the amine reactants that may be employed in producing the emulsifying agents of the novel wax emulsions, include propylene diamines, such as N-arachidyl-behenyl 1,3 propylene diamine, N-dodecylamine, N-hexadecylamine, N-octadecylamine, N-eicosylamine, N-dodecyl 1,3 propylene diamine, N-hexadecyl 1,3 propylene diamine, alkyl trimethyl ammonium chlorides and dialkyl dimethyl ammonium chlorides having alkyl carbon chain lengths of 10-40 carbon atoms.

The organic acid employed for reaction with the aforementioned amine reactant, as previously described, may comprise any organic acid having from about 1 to about 18 carbon atoms. Representative examples of these acids include formic acid, acetic acid, propionic acid and butyric acid. Representative inorganic mineral acids employed for reaction with the amine reactant include hydrochloric acid, sulfuric acid, phosphoric acid, nitric acid, and similar inorganic acids. It should be noted that the organic or inorganic mineral acid is employed in an amount sufficient only to react with all of the amine employed for preparing the emulsifying agent.

The emulsion modifier of the wax emulsion, as previously stated, comprises an amine having up to 12 carbon atoms, but a molecular weight which is lower than that of the amine reactant employed for producing the above-described emulsifying agent. Thus, these modifiers may comprise any low-molecular weight amine having up to 12 carbon atoms, and can thus comprise aliphatic, cycloaliphatic, aromatic and primary, secondary or tertiary amines. Representative amines employed as the emulsion modifier, include dicyclohexylamine, n-heptyl B-amine, n-octyl amine, n-dodecylamine, n-dodecyl 1,3-propylene diamine, aniline, and N-dodecyl 1,3 propylene B-diamine. Particular emphasis, with respect to the efficacy of the wax emulsions of the present invention, is placed upon the emulsion modifier for the reason that this modifier lowers the viscosity and improves the shear stability of the emulsion. The use of this modifier alone, however, without the emulsifying agent, has been found not to result in the above-described advantages.

The novel wax emulsions produced in accordance with the present invention, as previously indicated, are cationic in character. In essence, these emulsions contain a hydrophobic cation, i.e., an ion with a positive charge present in the amine employed for producing the emulsifying agent.

DESCRIPTION OF SPECIFIC EMBODIMENTS

The following examples will serve to illustrate the novel cationic wax emulsions of the present invention, the method for their preparation, and their efficacy when employed for industrial applications.

In order to illustrate the stabilizing efficiency of the cationic wax emulsions of the present invention, two series of emulsion formulations were prepared and their properties investigated. One series comprised the petroleum wax component and an emulsifying agent, while the other series comprised the petroleum wax component, an emulsifying agent and an emulsion modifier. The emulsion formulas, prepared in accordance with the above-mentioned two categories, are set forth in Table I, below, with respective quantities set forth in percent by weight. In preparing these emulsions, the following general procedure was employed in each instance:

The petroleum wax was melted in a beaker and maintained at a temperature of about 175–185° F. The required amount of water was heated to a temperature of about 160° F. and the amine reactant of the emulsifying agent was then added with stirring. The appropriate required quantity of acetic acid was then added and the resulting solution was stirred until clear. The emulsion modifier was thereafter added and the water solution was brought to a temperature of about 170–180° F. The wax component was then poured into the above-produced water phase and mixed until a homogeneous predispersion was formed. The resulting emulsion was then homogenized employing a Manton-Gaulin homogenizer at 1000 p.s.i. for a period of 5 minutes. The thus-produced emulsion was then discharged, cooled to a temperature of about 110° F., and was then ready for use.

TABLE I

| | Emulsion formulas | | | | | | | | | |
|---|---|---|---|---|---|---|---|---|---|---|
| | A | B | C | D | E | F | G | H | I | J |
| Paraffin wax 125/127 AMP | 40.00 | 40.00 | 40.00 | 40.00 | 40.00 | 40.00 | 40.00 | 40.00 | 40.00 | 40.00 |
| Microcrystalline wax 170° F.M.P | | | | | | | | | | |
| Paraffin oil, 100 SEC | | | | | | | | | | |
| N-octylamine | 1.08 | | | | | | 0.36 | | | 0.286 |
| N-dodecylamine | | 1.55 | | | | | | | | |
| N-hexadecylamine | | | 1.86 | | | | | | | |
| N-octadecylamine | | | | 2.21 | | | | | | |
| N-eicosylamine | | | | | 2.57 | 1.71 | | | | |
| N-dodecyl 1,3 propylene diamine | | | | | | | 2.12 | | | |
| N-octadecyl 1,3 propylene diamine | | | | | | | | 2.69 | | |
| N-eicosyl 1,3 propylene diamine | | | | | | | | | 3.09 | 2.03 |
| N-heptyl beta amine | | | | | | | | | | |
| Dicyclohexylamine | | | | | | | | | | |
| Acetic acid, glacial | 0.30 | 0.30 | 0.30 | 0.30 | 0.30 | 0.30 | 0.60 | 0.60 | 0.60 | 0.50 |

| | K | L | M | N | O | P | Q | R | S |
|---|---|---|---|---|---|---|---|---|---|
| Paraffin wax 125/127 AMP | 40.00 | 40.00 | 40.00 | 40.00 | | | 60.00 | 60.00 | 60.65 |
| Microcrystalline wax 170° F.M.P | | | | | 40.00 | 40.00 | | | |
| Paraffin oil, 100 SEC | | | | | | | 2.25 | 2.25 | 2.00 |
| N-octylamine | | | | | | | | | |
| N-dodecylamine | 0.502 | | | | | | | | |
| N-hexadecylamine | | | | | | | | | |
| N-octadecylamine | | | | | | | | | |
| N-eicosylamine | | | | | | | | | |
| N-dodecyl 1,3 propylene diamine | | 0.707 | | | | | | | |
| N-octadecyl 1,3 propylene diamine | | | | | | | | | |
| N-eicosyl 1,3 propylene diamine | 2.03 | 2.03 | 2.03 | 2.03 | 3.09 | 2.03 | 2.63 | 2.63 | 2.00 |
| N-heptyl beta amine | | | | 0.286 | | | 0.29 | 0.38 | |
| Dicyclohexylamine | | | 0.453 | | | | | | 0.35 |
| Acetic acid, glacial | 0.50 | 0.60 | 0.50 | 0.50 | 0.60 | 0.50 | 0.56 | 0.56 | 0.44 |

The characteristic properties employed for determining the effectiveness of the particular emulsion under investigation, comprised tests for determining Brookfield viscosity and emulsion shear stability. For this purpose, a Brookfield viscometer, Model RVT with a number one (1) spindle was used for obtaining viscosity determinations. A tester employed for determining shear stability was patterned after the apparatus described in Analytical Chemistry, vol. 25, No. 7, July 1953, in an article entitled "Chemical Stability Test for Rubber Lattices." This test is carried out employing 60 grams of emulsion, which is subjected to shear under a 10 lb. load (as shown in FIG. 12 of the aforementioned article), with a rotor speed of 1320 r.p.m. for a period of two minutes. The shear rating is the reciprocal of the grams of wax sheared out of the emulsion (indicated as G in the following tables), inasmuch as this factor more closely represents stability of shear under practical operating conditions.

In carrying out the above-described tests, all of the formulations, A through N, employed, comprised 40.00 weight percent of fully refined paraffin wax 125/127 AMP melting point, 0.0075 mol of either active amine or diamine per 100 grams of emulsion, and an amino group/acetic acid equivalents ratio of 1.50. The data obtained for the investigation of primary monoamines employed for use in producing the emulsifying agent are presented in Table II below, while that obtained for employing diamines in producing the emulsifying agent, are presented in the following Table III.

cluded in emulsion I of Table I, was replaced by 0.0025 mol of the indicated amine modifier of Table IV. This TABLE II.—EMULSION SHEAR STABILITY AND VISCOSITY RESULTS EMPLOYING PRIMARY MONO-AMINE REACTANTS WITH ACETIC ACID

| Run No. | Amine | Emulsion | Avg. shear (G) | 1/G=G⁻¹ | Brookfield viscosity, cp. at | | | | |
|---|---|---|---|---|---|---|---|---|---|
| | | | | | 1 r.p.m. | 10 r.p.m. | 20 r.p.m. | 50 r.p.m. | 100 r.p.m. |
| 1 | N-octylamine | A | Total | 0 | (No stable emulsion formed.) | | | | |
| 2 | N-dodecylamine | B | 18.347 | 0.0545 | 65 | 36 | 34.0 | 39.1 | 46.8 |
| 3 | N-hexadecylamine | C | 0.762 | 1.312 | 1,030 | 215 | 138 | 83.2 | 71.1 |
| 4 | N-octadecylamine | D | 0.875 | 1.143 | 1,230 | 288 | 194 | 127 | 103 |
| 5 | N-eicosylamine | E | 0.785 | 1.274 | 2,900 | 512 | 315 | 172.4 | 100+ |
| 6 | N-eicosylamine plus N-octylamine | F | 0.531 | 1.883 | 20.0 | 17.0 | 18.0 | 25.2 | 32.1 |

TABLE III.—EMULSION SHEAR STABILITY AND VISCOSITY RESULTS EMPLOYING DIAMINE REACTANTS WITH ACETIC ACID

| Run No. | Diamine | Emulsion | Avg. shear (G) | 1/G=G⁻¹ | Brookfield viscosity, cp. at | | | | |
|---|---|---|---|---|---|---|---|---|---|
| | | | | | 1 r.p.m. | 10 r.p.m. | 20 r.p.m. | 50 r.p.m. | 100 r.p.m. |
| 1 | N-dodecyl 1,3-propylene diamine | G | 17.622 | 0.0568 | 640 | 129 | 83.5 | 56.2 | 57.5 |
| 2 | N-octadecyl 1,3-propylene diamine | H | 1.770 | 0.565 | 4,580 | 711 | 418 | | |
| 3 | N-eicosyl 1,3-propylene diamine | I | 0.255 | 3.921 | 5,280 | 868 | | | |

From the foregoing Table II, it will be noted that insofar as the use of primary mono-amine emulsifying agents are concerned, both emulsion viscosity and shear stability increase with the increasing number of carbon atoms of the amine, but that the shear stability reaches an upper limit at a carbon content of 20 and higher (Run No. 5). Thus, it becomes apparent that for the use of primary mono-amine emulsifying agents, the shear stability can only be improved by increasing the concentration of the emulsifying agent. On the other hand, in comparing Run No. 5 with Run No. 6 of Table II, it will be noted that the use of n-octylamine, as an emulsion modifier in combination with the N-eicosylamine, reduces the viscosity of the emulsion (viz., from 2900 cp. to 20 cp., as, for example, at 1 r.p.m.). The shear rating is improved from 1.274 to 1.883.

It will also be noted, from the foregoing Table III, insofar as the use of diamine emulsifying agents are concerned, shear stability increases with an increase in the number of carbon atoms of the diamine, and that good results are obtained employing diamines having a carbon atom content above 20. It will also be noted, however, that as the carbon atom content of the diamine is increased, there also results a disadvantage of increase in viscosity.

The following Table IV shows the results obtained with respect to a series of emulsions which were formulated for the evaluation of various amines to function as shear stability improvers and viscosity modifiers. For this purpose, 0.0050 mol of N-eicosyl 1,3 propylene diamine was employed for each 100 grams of emulsion, and 0.0025 mol of N-eicosyl 1,3 propylene diamine previously included in emulsion I of Table I, was replaced by 0.0025 mol of the indicated amine modifier of Table IV. This evaluation was also carried out for the N-eicosylamine of Run No. 5 of Table II.

TABLE IV.—EMULSION SHEAR STABILITY AND VISCOSITY RESULTS

| Run No. | Emulsifying agent plus emulsion modifier | Emulsion | Avg. Shear (G) | 1/G= G⁻¹ | Brookfield viscosity, cp. at | | | | |
|---|---|---|---|---|---|---|---|---|---|
| | | | | | 1 r.p.m. | 10 r.p.m. | 20 r.p.m. | 50 r.p.m. | 100 r.p.m. |
| 1 | N-eicosyl 1,3-propylene diamine plus n-octylamine | J | .292 | 3.425 | 295 | 67 | 49 | 43.1 | 51.9 |
| 2 | N-eicosyl 1,3-propylene diamine plus n-dodecylamine | K | .199 | 5.028 | 2,160 | 349 | 209 | 112 | 86 |
| 3 | N-eicosyl 1,3-propylene diamine plus N-dodecyl 1,3-propylene diamine | L | .092 | 10.87 | 1,075 | 192 | 119 | 69.5 | 62 |
| 4 | N-eicosyl 1,3-propylene diamine plus n-heptyl B-amine | M | .325 | 3.078 | 1,870 | 339 | 219 | 137.4 | 101 |
| 5 | N-eicosyl 1,3-propylene diamine plus dicyclohexylamine | N | .235 | 3.510 | 60 | 31 | 26.8 | 32.9 | 42.1 |
| 6 | N-eicosyl 1,3-propylene diamine only | I | .255 | 3.921 | 5,820 | 868 | | | |

As will be seen from the preceding Table IV for emulsion I, the viscosity rating at 1 r.p.m. was 5820 cp., employing the N-eicosyl 1,3-propylene diamine as the emulsifying agent (Run No. 6). However, the additional presence of n-octylamine in emulsion J (Run No. 1) reduced the viscosity to 295 cp. The additional presence of n-dodecylamine in emulsion K reduced the viscosity to 2160 cp. (Run No. 2). The additional presence of n-decyl 1,3-propylene diamine in emulsion L reduced the viscosity to 1075 cp. (Run No. 3). The additional presence of n-heptyl B amine in emulsion M reduced the viscosity to 1870 cp. (Run No. 4). The use of dicyclohexylamine in emulsion N reduced the viscosity to 60 cp. (Run No. 5)).

As will also be seen from Table IV, the shear stability employing N-eicosyl 1,3-propylene diamine was only 3.921 (Run No. 6). The addition of n-octylamine reduced the shear stability, slightly to 3.425 (Run No. 1). The addition of n-dodecylamine increased the shear stability to 5.028 (Run No. 2) and the addition of n-dodecyl 1,3-propylene diamine increased it to 10.87 (Run No. 3). It will also be seen that the addition of n-heptyl B-amine (Run No. 4) and dicyclohexylamine (Run No. 5) also reduced the shear stability slightly.

In the following Table V, are shown the emulsion shear stability and viscosity results obtained in modifying the emulsions of the present invention by the substitution of microcrystalline wax, for paraffin wax, and compared therewith, as the petroleum wax component.

TABLE V.—EMULSION SHEAR STABILITY AND VISCOSITY RESULTS

| Run No. | Wax component | Emulsion | Avg. shear (G) | 1/G=G⁻¹ | Brookfield viscosity, cp. at | | | | |
|---|---|---|---|---|---|---|---|---|---|
| | | | | | 1 r.p.m. | 10 r.p.m. | 20 r.p.m. | 50 r.p.m. | 100 r.p.m. |
| 1 | 40% Microcrystalline wax | O | .398 | 2.513 | 3670 | 616 | 380 | 100+ | |
| 2 | 40% Microcrystalline wax plus n-heptyl B-amine | P | 0.312 | 3.207 | 295 | 83 | 64.0 | 57.5 | 69 |
| 3 | 60% Pariffin wax, unmodified | Q | (Paste, could not discharge from homogenizer) | | | | | | |
| 4 | 60% Pariffin wax plus n-heptyl B-amine | R | .146 | 6.85 | 16,000 | 2,980 | 2,210 | 1,395 | 1,007 |
| 5 | 62% Paraffin wax, oil plus dicyclohexylamine | S | .223 | 4.48 | 7,200 | 1,460 | | | |

Thus, as shown in preceding Table I, emulsion A was modified by replacing the paraffin wax component with a 170° F. melting point microcrystalline wax, using the same formula as for emulsion I in Table III (Run No. 3). In Table I, it will be noted, this microcrystalline wax-containing emulsion, is designated as emulsion O. It will be noted from Table V that the viscosity rating at 1 r.p.m. is 3670 cp., and that the shear rating is 2.513 (Run No. 1). When n-heptyl B-amine was used as the emulsion modifier, in emulsion P of Run No. 2, the viscosity rating was reduced to 295 cp., and the shear rating improved to 3.207.

An emulsion was also prepared comprising 60 percent, by weight, paraffin wax, 2.63 percent N-eicosyl 1,3-propylene diamine, 2.25 percent mineral oil, 0.56 percent acetic acid, and the balance water, corresponding to emulsion Q in Table I. As is shown in Run No. 3 of Table V, the emulsion was found to be too viscous to be handled adequately and caused seizure of the homogenizer. However, the identical formula incroporating n-heptyl B-amine, as a modifier, proved to be much lower in viscosity, as is shown in Run No. 4 of Table V (corresponding to emulsion R of Table I), and illustrating the importance of viscosity modifiers with a high-solids content system. Run No. 5 of Table V illustrates the advantage of employing dicyclohexylamine over n-heptyl B-amine, as a modifier (emulsion S in Table I), thus making possible the production of emulsions having a high-solids content, and having, at the same time, very low viscosities.

It should be noted, as previously indicated, that any desired mineral acid may be substituted for the organic acid reactant to produce the corresponding amine salt, and the latter combined with the petroleum wax and emulsion modifier components, in the manner indicated above, and to successfully employ these emulsions as coatings or to incorporate them by conventional methods into particle board compositions or as sizing agents in paper and other pulp products.

From the foregoing it will become apparent that the improved cationic wax emulsions of the present invention are highly attractive for adaptability in various commercial applications, as previously indicated, by virtue of their outstanding stability under shear stress, relatively low viscosities, and a relatively high degree of pumpability, and, at the same time, possessing the ability to have incorporated therein a relatively high wax-solids content. Although the present invention has been described herein by means of certain specific embodiments and illustrative examples, it is not intended that the scope thereof be limited in any way, and is capable of various modifications and adaptations, as those skilled in the art will readily appreciate.

We claim:
1. An aqueous cationic wax emulsion consisting essentially of:
  (a) from about 10 to 70 percent, by weight, of a dispersed phase comprising a petroleum wax;
  (b) from about 0.5 to about 10 percent, by weight, based on the quantity of the petroleum wax component present, of an emulsifying agent comprising a salt of an acid selected from the group consisting of organic acids, having from about 1 to about 18 carbon atoms, and inorganic mineral acids reacted with an amine having from about 10 to about 40 carbon atoms, said acid being present in an amount sufficient only to react with all of said amine; and
  (c) from about 0.05 to about 3 percent, by weight, based on the total quantity of the petroleum wax and emulsifying agent components present, of an emulsion modifier consisting essentially of an amine having up to 12 carbon atoms and having a molecular weight lower than that of the amine reactant employed for producing the aforementioned emulsifying agent.

2. The emulsion of claim 1 wherein said petroleum wax comprises a paraffin wax.

3. The emulsion of claim 1 wherein said petroleum wax comprises a microcrystalline wax.

4. The emulsion of claim 1 wherein said organic acid reactant employed for producing the emulsifying agent contains from about 1 to about 6 carbon atoms.

5. The emulsion of claim 1 wherein said organic acid reactant employed for producing the emulsifying agent is acetic acid.

6. The emulsion of claim 1 wherein said inorganic acid reactant employed for producing the emulsifying agent is hydrochloric acid.

7. The emulsion of claim 1 wherein said amine reactant employed for producing the emulsifying agent contains from about 20 to about 40 carbon atoms.

8. The emulsion of claim 1 wherein said amine reactant employed for producing the emulsifying agent is propylene diamine.

9. The emulsion of claim 1 wherein said amine reactant employed for producing the emulsifying agent is N-arachidyl-behenyl 1,3 propylene diamine.

10. The emulsion of claim 1 wherein the amine employed as the emulsion modifier is dicyclohexylamine.

11. The emulsion of claim 1 wherein said petroleum wax is present in an amount from about 40 to about 70 percent, by weight, of the total quantity of the emulsion; said emulsifying agent is present in an amount of from about 1 to about 8 percent, by weight, based on the quantity of the petroleum wax component present; and the emulsion modifier is present in an amount from about 0.1 to about 2 percent, by weight, based on the total quantity of the petroleum wax and emulsifying agent components present.

12. An article of manufacture comprising a cellulosic material containing as a coating material a cationic wax emulsion as defined by claim 1.

13. An article of manufacture comprising a particle board composition containing as a water-proofing material a cationic wax emulsion as defined by claim 1.

14. A method for preparing a cationic wax emulsion, as defined in claim 1, which comprises: reacting an aqueous mixture of an amine, having from about 10 to about 40 carbon atoms, with an acid selected from the group consisting of organic acids having from about 1 to about 18 carbon atoms, and inorganic mineral acids in an amount only sufficient to react with all of said acid to produce an emulsifying agent comprising an aqueous solution of the corresponding amine salt; and combining the aqueous solution of the amine salt thus produced with an emulsion modifier, comprising an amine having up to 12 carbon atoms and a molecular weight lower than that employed in the amine reactant for producing the aforementioned emulsifying agent, and petroleum wax.

15. A method as defined in claim 14 wherein the acid reactant employed for producing the emulsifying agent is acetic acid, the amine reactant employed for producing the emulsifying agent is N-arachidyl-behenyl 1,3 propylene diamine, the amine employed as the emulsion modifier is dicyclohexylamine, and the petroleum wax comprises a paraffin wax.

16. A method as defined in claim 14 wherein the acid reactant employed for producing the emulsifying agent is hydrochloric acid, the amine reactant employed for producing the emulsifying agent is N-arachidyl-behenyl 1,3 propylene diamine, the amine employed as the emulsion modifier is dicyclohexylamine, and the petroleum wax comprises a paraffin wax.

References Cited
UNITED STATES PATENTS

| | | | |
|---|---|---|---|
| 2,442,972 | 8/1948 | Edelstein | 106—271 |
| 2,780,554 | 5/1957 | Lerner | 106—271 |

MORRIS LIEBMAN, Primary Examiner

T. MORRIS, Assistant Examiner

U.S. Cl. X.R.

106—10; 252—311.5; 260—28.5

PO-1050
(5/69)

UNITED STATES PATENT OFFICE
CERTIFICATE OF CORRECTION

Patent No. 3,539,367        Dated November 10, 1970

Inventor(s) GEORGE A. YAROSHEVICH and DONALD R. CUSHMAN and ROY T. EDWARDS

It is certified that error appears in the above-identified patent and that said Letters Patent are hereby corrected as shown below:

Column 1, line 30, for "This invention relates" read

--This invention, which is a continuatio
in-part of our application Serial
No. 546,176 filed April 29, 1966, rela Table III, last
line of column 6, for "5,280" read --5,820--

Table IV, last
line of column 3, for "1" read --I--

SIGNED AND
SEALED
JUN 23 1971

(SEAL)
Attest:

Edward M. Fletcher, Jr.
Attesting Officer

WILLIAM E. SCHUYLER, JR.
Commissioner of Patents